US005886672A

United States Patent [19]

Brune et al.

[11] Patent Number: 5,886,672

[45] Date of Patent: Mar. 23, 1999

[54] COLLAPSIBLE ANTENNA

[75] Inventors: Scott A. Brune, Leo; Matthew R. Williams, Fort Wayne, both of Ind.

[73] Assignee: Innotek Pet Products, Inc., Garrett, Ind.

[21] Appl. No.: 792,696

[22] Filed: Jan. 29, 1997

[51] Int. Cl.[6] .......... H01G 11/10

[52] U.S. Cl. .......... 343/792.5; 343/810; 343/812; 343/815

[58] Field of Search .......... 349/792.5, 793, 349/810, 812, 814, 815, 816, 817, 818, 819, 820, 821; H01Q 11/10

[56] References Cited

U.S. PATENT DOCUMENTS

| | | | |
|---|---|---|---|
| 3,210,767 | 10/1965 | Isbell | 343/792.5 |
| 3,978,489 | 8/1976 | Kurland et al. | 343/874 |
| 4,220,956 | 9/1980 | Sanford | 343/706 |
| 4,223,317 | 9/1980 | Rod | 343/803 |
| 4,355,315 | 10/1982 | Zoulek | 343/792.5 |
| 4,506,268 | 3/1985 | Kuo | 343/792.5 |
| 4,977,408 | 12/1990 | Harper et al. | 343/792.5 |
| 4,987,424 | 1/1991 | Tamura et al. | 343/795 |
| 5,196,858 | 3/1993 | Reed | 343/900 |
| 5,214,439 | 5/1993 | Reed | 343/877 |
| 5,220,338 | 6/1993 | Matsushita | 343/795 |

*Primary Examiner*—Hoanganh Le
*Attorney, Agent, or Firm*—Barnes & Thornburg

[57] ABSTRACT

An antenna which includes a rigid boom and a plurality flexible antenna elements attached to the boom. The antenna elements have curved cross-sections and are made from a material which allows them to resiliently bend upon contacting an object. The antenna is particularly suitable for mobile field use such as tracking objects tagged with radio frequency transmitters. In such use, the flexible antenna elements easily bend when contacting objects such as branches, brush and other vegetation so as not to become entangled and prevent movement of the antenna.

49 Claims, 5 Drawing Sheets

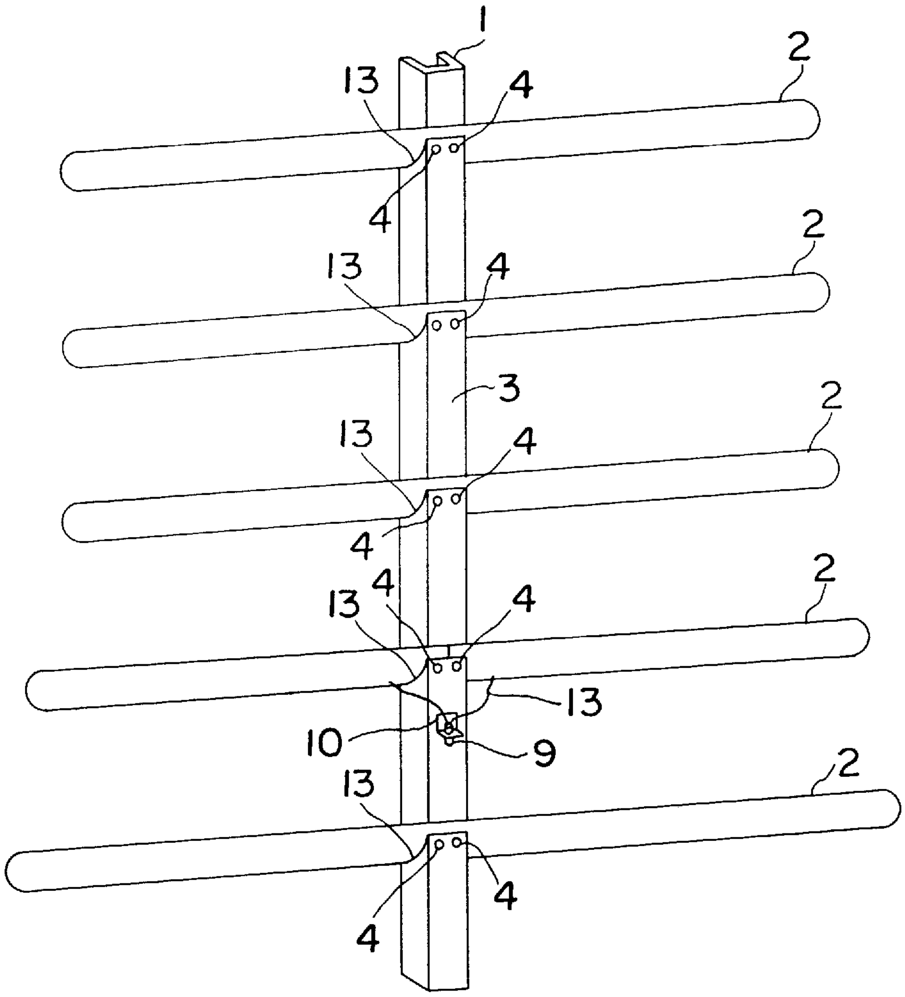
FIG. 4
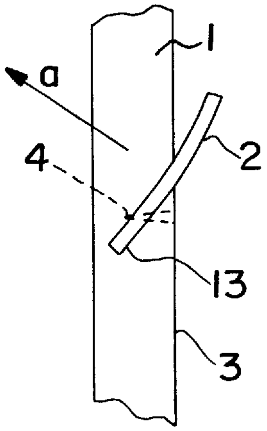
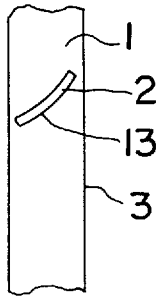
FIG. 6
FIG. 5

COLLAPSIBLE ANTENNA

TECHNICAL FIELD

The present invention relates to antennas and more particularly to antennas for rough field use which have flexible elements.

BACKGROUND ART

There are a number of situations in which antennas are used in field environments. For example, animals are often tagged with radio transmitters which enable the monitoring of migratory and/or territorial habits. The location of such tagged animals is often monitored by a radio receiver attached to a hand-held antenna. Other examples of situations in which antennas are used in field environments include the tracking of hunting dogs that are equipped with radio transmitters, military field tracking operations, weather balloon tracking, etc.

In field environments associated with such procedures, the use of an antenna having fixed or rigid elements can be bothersome, particularly when it is necessary to move through forests, woods, and other areas of brush or vegetation.

Antennas typically used for tracking or locating radio transmitter-tagged objects comprise planar structures which include a plurality of rigid dipole elements that extend from a central boom. As is known, the length of the dipole elements can vary, depending on the frequency of the signal which is to be received.

The use of flexible antenna elements has been suggested in remotely deployable antennas. U.S. Pat. Nos. 5,214,439 and 5,196,858 to Reed disclose deployable antennas which include S-shaped antenna elements that are wound around spools located in an elongated housing or drum. The antenna elements are deployed or extended from the drum by rotating the spools relative to the drum. U.S. Pat. No. 4,977,408 to Harper et al. discloses a deployable antenna which is similar to the deployable antennas of Reed. The deployable antenna of Harper et al. utilizes C-shaped antenna elements which are wound around spools.

U.S. Pat. No. 4,355,315 to Zoulek discloses a log periodic directional antenna which includes a plurality of stainless steel spring-type antenna elements that are provided as half elements which are mounted to opposite sides of the boom. Zoulek's antenna is designed to provide either horizontal or vertical polarization when mounted to a mast.

The present invention provides an antenna having flexible elements which allows the antenna to be used in rough field environments where the antenna is likely to encounter various obstacles during use.

DISCLOSURE OF THE INVENTION

It is accordingly one object of the present invention to provide an antenna having a plurality of flexible antenna elements.

Another object of the present invention is to provide an antenna which can be folded into a collapsed position for storage.

It is another object of the present invention to provide an antenna which can folded into a collapsed position as it is pushed into a storage case.

It is a further object of the present invention to provide an antenna for field use which has flexible antenna elements that bend when they encounter an obstacle and unbend into their original position thereafter.

A further object of the present invention is to provide an antenna for use in tracking and locating radio transmitters.

A further object of the present invention is to provide an antenna for use in tracking animals which are tagged with radio transmitters.

A still further object of the present invention is to provide a method of locating a radio transmitter in a obstacle-strewn area using an antenna having flexible antenna elements.

According to these and further objects of the present invention which will become apparent as the description thereof proceeds below, the present invention provides an antenna which includes:

a rigid boom; and a plurality of flexible antenna elements attached to the boom, each of the plurality of flexible antenna elements having a fixed length and a curved cross-sectional shape, and being attached to the boom in such a manner so as to prevent relative movement thereof with respect to the boom at a point of attachment thereto.

The present invention further provides a flexible antenna which includes:

a rigid boom having a non-circular cross-sectional shape; and a plurality of flexible antenna elements attached to the boom; each of the plurality of flexible antenna elements having a fixed length and a curved cross-sectional shape.

The present invention also provides a method for tracking a transmitted radio signal which involves:

providing a receiver for receiving a transmitted radio signal;

attaching an input of the receiver to an antenna having flexible antenna elements;

moving the antenna to locate the direction of the transmitted radio signal, the moving including contacting the flexible antenna elements with an object which causes at least one of the flexible antenna elements to bend and assume its original position.

BRIEF DESCRIPTION OF DRAWINGS

The present invention will be described hereafter with reference to the attached drawings which are given as non-limiting examples only, in which:

FIG. 4 is a perspective view of an antenna according to another embodiment of the present invention.

FIG. 5 is a cross-sectional view of the boom of the antenna of FIG. 4 which shows how the antenna elements are positioned.

FIG. 6 is a cross-sectional view of a boom according to another embodiment of the present invention which shows an alternative manner of positioning the antenna elements.

BEST MODE FOR CARRYING OUT THE INVENTION

Figure 1:
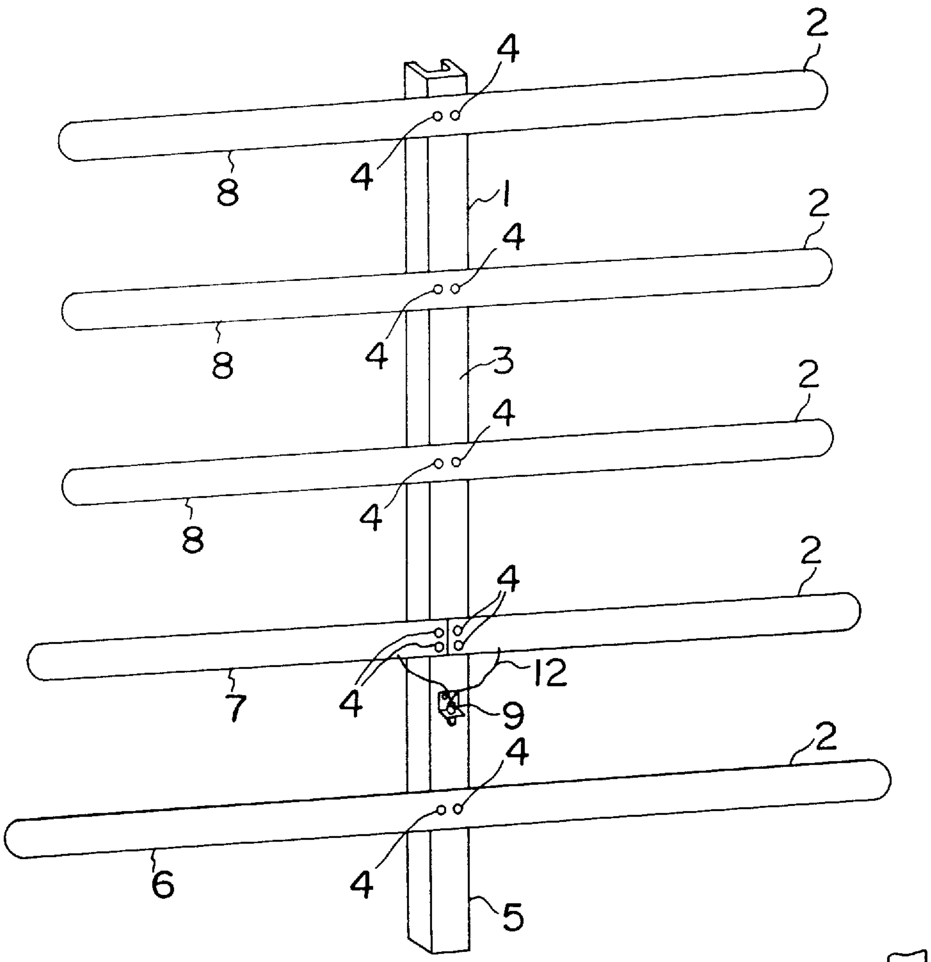
FIG. 1 is a perspective view of an antenna according to one embodiment of the present invention.
Figure 2:
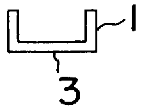
FIG. 2 is a cross-sectional view of a boom used in the antennas of the present invention according to one embodiment.

The present invention is directed to antennas which have flexible antenna elements. The flexible elements are attached to a central boom that can be hand-held at one end. The flexible elements are designed to easily bend when they encounter an obstruction as the antenna is moved.

The flexible antennas of the present invention are particularly useful in rough terrains such as forests, woods or other areas of brush or vegetation when tracking and following a radio transmitter-tagged object such as an animal. Although primarily designed for hand-held use, it is to be understood that the antennas of the present invention could likewise be mounted on a vehicle that is driven through an area having obstacles that will brush against the antennas. Alternatively, the antennas of the present invention could be mounted in fixed locations where they are likely to be contacted by traveling objects.

The flexible antenna elements of the present invention are elongated metal elements which have a curved cross-sectional shape. The flexible antenna elements are made from suitable metals such as spring steel or shape-memory materials which allows the antenna elements to return to their original shape after being bent or folded. Examples of materials which are not limited to the exclusive use of metals include metal laminate plastics, metal impregnated plastics, metal coated plastics, metal plated plastics, etc. It is also possible to attach rigid or non-rigid antenna elements to the boom by means of spring connectors which allow the antenna elements to bend or fold relative to the boom, such spring connectors may be integral or separate from the antenna elements. The antenna includes a driver element, at least one reflector element and one or more director elements.

The flexible antenna elements are attached to the boom in such a manner that they are parallel with their curved cross-sections aligned. It has been discovered that the bandwidth of the antenna can be increased by increasing the width of the flexible antenna elements and/or aligning the concave sides of the flexible antenna elements in the direction along which a signal is to be received.

The use of flexible antenna elements allows the antenna to be folded and stored in a storage case or pouch when not in use. In its folded and stored state, the antenna of the present invention can be easily carried by a variety of users. In addition to tracking radio transmitter-tagged mobile objects such as animals, the antenna can be carried by a user and, when necessary, used to locate a radio transmitter-tagged base. For example, hikers, horseback riders, hunters, fishermen, boaters, and the like could carry a folded and stored antenna according to the present invention and use the antenna to locate a base which is equipped with a radio transmitter. In addition to those applications noted above for radio transmitter-tagged mobile objects, the antennas of the present invention can be used to locate mental deficient persons such as alzheimer patients, who wonder away from their care centers. Such persons can be equipped with a radio transmitter attached to their clothing or otherwise worn in some suitable fashion.

FIG. 1 is a perspective view of an antenna according to one embodiment of the present invention. As shown in FIG. 1, the antenna includes a boom 1 to which is attached a plurality of flexible antenna elements 2. The boom 1 depicted in FIG. 1 has a U-shaped cross-section which provides the necessary rigidity to support the antenna elements 2 while limiting the overall weight of the antenna. It is to be understood that the boom 1 can have other cross-sectional shapes, as desired, which provide the necessary rigidity to support the flexible antenna elements 2, including a solid or hollow square, rectangular, or triangular shape, an I-, H-, or L-shape, etc. The boom 1 is made from a non-conducting material, examples of which include resinous materials and plastic materials.

In the embodiment of the invention depicted in FIG. 1 it is necessary for the boom 1 to have a flat surface 3 to which the flexible antenna elements 2 are attached. As depicted, the flexible antenna elements 2 are attached at their centers to the boom 1 by suitable mechanical means such as screws 4. Alternatively, the flexible antenna elements 2 could be attached to boom 1 by means of clips, cements, epoxies, or the like. FIG. 1 depicts the use of two screws 4 which are used to secure each flexible antenna element 2 to boom 1. The use of two screws ensures that the flexible antenna elements 2 do not pivot with respect to the boom 1. Ideally, all of the flexible antenna elements 2 are secured to the boom 1 so that they remain parallel to one another. This can be accomplished by securing the flexible antenna elements 2 to the boom at two points or by using clips, cements, epoxies, or other equivalent means. It is noted that one of the flexible antenna elements 2 which functions as a driver element has two arms which extend in opposite directions from the boom 1. These two arms can be attached to the boom 1 by two or more screws 4 as depicted. In addition, an insulating spacer (not shown) may be positioned between the fixed ends of the two arms of the driver element in order to prevent contact therebetween.

The length of the boom 1, and number and lengths of the flexible antenna elements 2 can be chosen to accommodate a desired transmitted and/or received radio frequency. In general, the antenna includes a reflector element near the free end 5 of boom 1, one or more director elements on the opposite end of the boom 1, and a two-piece driver element between the reflector element and the director elements. As depicted in FIG. 1, the reflector element 6 is longer than the driver element 7 and director elements 8, and the driver element 7 is longer than the director elements 8. Such antenna characteristics are conventional. It is also within the scope of the present invention to provide antenna elements 2 on two perpendicular sides of boom 1 in order to provide a crossed dipole array. It is further within the scope of the present invention to utilize the flexible antenna elements 2 in conjunction with an antenna which is used to receive and/or transmit a radio frequency signal.

Figure 7:
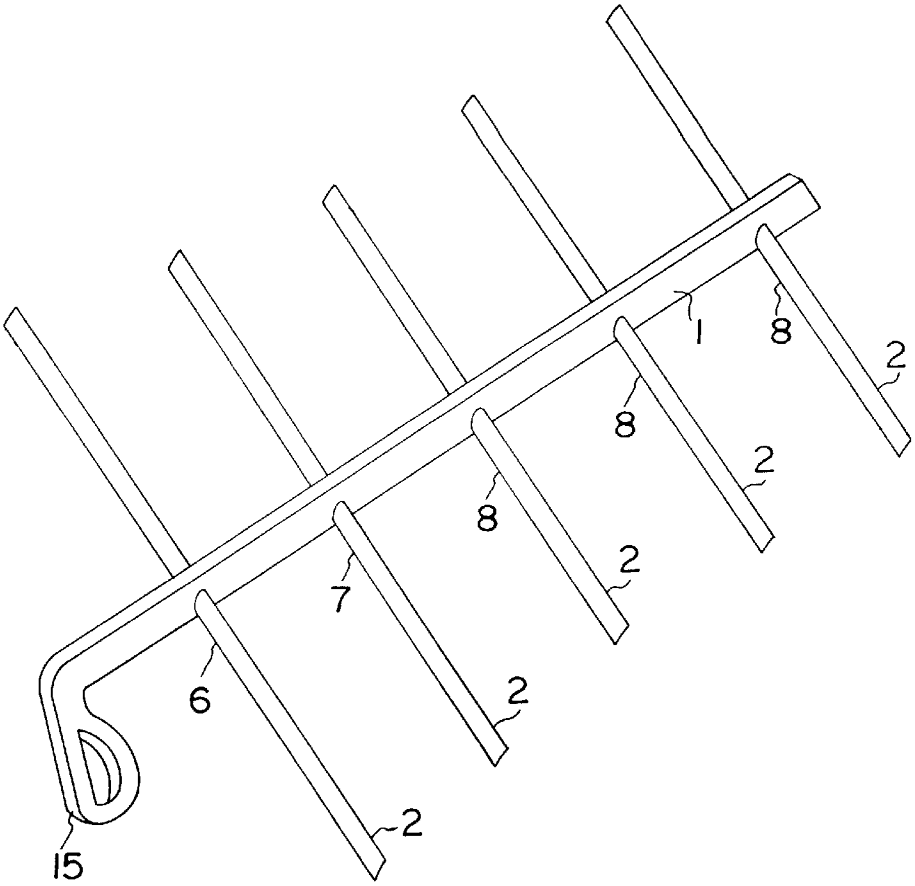
FIG. 7 is a perspective view of an antenna according to another embodiment of the present invention.

The antennas of FIGS. 1, 4 and 7 are designed to be hand-held by free end 5 of boom 1. In order to facilitate holding the antennas, the free end 5 of boom 1 can be provided with a molded handle or other gripping structure or surface configuration as desired. Such a handle can be integral with the boom 1 or attached thereto according to any convenient manner. Alternatively, the antenna can be mounted to a movable or stationary support by fastening the boom 1 thereto with screws, bolts, brackets, or other suitable means, including a mast.

Figure 3:
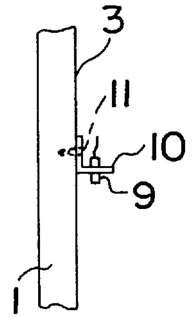
FIG. 3 is a detailed illustration of a cable connector used according to one embodiment of the present invention.

FIG. 3 is a detailed illustration of a lead wire connector used according to one embodiment of the present invention. As shown in FIG. 3, a lead wire connector 9, e.g., coaxial cable connector, can be mounted to boom 1 by a suitable bracket 10. Bracket 10 can be either integral with boom 1 or otherwise attached thereto by mechanical means such as screws 11, cement or epoxy, or similar means. Alternatively, lead wire connector 9 could be directly mounted in a bore provided in boom 1. Lead wire connector 9 provides means to connect a lead wire, i.e. coaxial cable (not shown) to the driver element of the antenna. For example, as depicted, wires 12 from lead wire connector 9 can be attached to each arm of the driver element. Such wire 12 can either be permanently attached to the flexible antenna element 2 by a clip, rivet, screw or other mechanical means or by soldering, welding, cementing, etc. Alternatively, in the case of a collapsible antenna, discussed below, the wire 12 can be removably attached to the driver element 7 by means of a removable clip, clamp, pin, or similar mechanical means. In another embodiment the balun discussed in detail below can be attached to each arm of the driver element 7 and coupled to a lead wire connector which extends from or is provided in or on boom 1.

FIG. 4 is a perspective view of an antenna according to another embodiment of the present invention. The antenna of FIG. 4 includes a boom 1 which is provided with angled, curved slots 13 which receive flexible antenna elements 2. Since the flexible antenna elements 2 are received in slots 13 of boom 1, it is not necessary for the boom in this embodiment to have a flat surface upon which to attach the antenna elements 2. Accordingly, in addition to the cross-sectional shapes mentioned above, the antenna depicted in FIG. 4 can have a boom 1 which has a cross-section that is circular, oval shaped, ribbed, or any other convenient shape which is sufficiently rigid to support the flexible antenna elements 2 and shaped to accommodate slots 13.

The flexible antenna elements 2 can be secured in slots 13 by suitable mechanical means such as screws 4. Alternatively, clips, cements, epoxies, or the like could be used to secure flexible elements 2 in the slots 13 of boom 1. FIGS. 4 and 5 depict the flexible antenna elements 2 as extending out of the tops of slots 13. In this embodiment, the depth of the slots 13 is less than the width of the flexible antenna elements 2.

As will be understood from the discussion which follows, slots 13 are provided to allow for the flexible antenna elements 2 to be secured to boom 1 at an angle. Accordingly, as long as a desired angle is obtained, the flexible antenna elements 2 may or may not extend from the top of slots 13. If slots 13 are provided with a depth equal to or greater than the width of the flexible antenna elements 2, the dimensions of boom 1 may have to be increased, thus adding weight to the antenna. However, if the flexible antenna elements 2 extend beyond the top of slots 13, the likelihood of the antenna getting caught in brush, vines, and the like increases.

The embodiment of the invention depicted in FIG. 4 illustrates how the flexible antenna elements 2 can be aligned so as to fold with respect to the boom 1. The flexible antenna elements 2 have a curved or arc shaped cross-section as depicted in FIG. 5. This shape is similar to the cross-sectional shape of conventional steel measuring tapes.

Due to their curved or arc shaped cross-section, the flexible antenna elements 2 can be easily folded without kinking or permanently bending the elements. Because of the cross-sectional shape and spring nature of the flexible antenna elements 2 folding tends to occur at any point along the elements. However, twisting can only occur along a length of the flexible antenna elements 2. Accordingly, the alignment of the flexible antenna elements 2, i.e, the alignment of their curved or arc shaped cross-section, determines how the antenna elements can be folded. For example, in FIG. 1 the flexible antenna elements 2 would tend to fold perpendicular to surface 3 of boom 1. In FIG. 4 the flexible antenna elements 2 would tend to fold outward from surface 3 of boom 1 and downward. The tendency for the flexible antenna elements 2 to fold downwardly can be understood from the alignment of the elements 2 with respect to boom 1 as depicted in FIG. 5. In FIG. 5 the flexible antenna element 2 tends to fold in the direction of arrow "a" when a force is applied to the opposite side of the antenna element 2. It is noted that although the flexible antenna elements 2 can fold either against their concave or convex sides, there is a less likelihood of permanently bending or kinking the antenna elements 2 if they are folded against their concave sides.

From the above discussion, it can be seen that the flexible antenna elements 2 of the embodiment of the antenna depicted in FIGS. 4 and 5 can be more easily folded along the axis of the boom 1. Thus, this embodiment provides an antenna which can be collapsed along the boom 1 and stored in a hard or soft case. Examples of such cases include heavy cloth or canvas bags, leather bags, rigid or flexible tubes having caps on either or both ends, or other suitable cases. Tubular cases which can be opened at either end have the advantage of allowing a collapsed antenna to be inserted in one end and removed from the opposite end.

Although not discussed, the antenna embodiment depicted in FIG. 4 includes a lead wire connector 9 as discussed above with reference to FIG. 1 or balun as discussed below. This embodiment may also include a handle at the lower end of the boom as discussed herein.

FIG. 6 is a cross-sectional view of the boom according to another embodiment of the present invention which shows an alternative manner of positioning the antenna elements. The slots 13 in FIG. 6 are exclusively located in the sidewalls of boom 1. In this embodiment, the flexible antenna elements 2 can be slid into slots 13 which are provided in either sidewall of the boom 1. Once inserted, the flexible antenna elements 2 can be secured in position by screws, clips, cements, epoxies, or other equivalent means.

Figure 8:
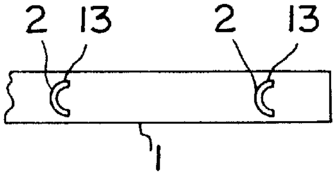
FIG. 8 is a cross-sectional view of the boom of the antenna of FIG. 7.

FIG. 7 is a perspective view of an antenna according to another embodiment of the present invention. The antenna embodiment depicted in FIG. 7 has a boom 1, and a plurality of flexible antenna elements 2, which include a reflector element 6, a driver element 7, and one or more director elements 8. In this embodiment, the flexible antenna elements 2 pass through slots 13 which are provided in opposed sides of the boom 1. As will be understood from the discussion to follow, slots 13 may be straight or curved. The flexible antenna elements 2 are secured in a manner discussed below. As shown in FIG. 8, the concave side of the flexible antenna elements 2 face away from handle 15.

Figure 9A:
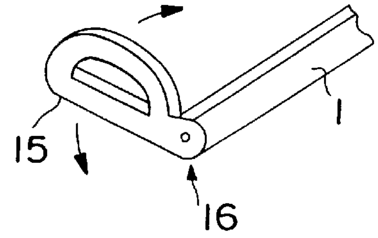
FIGS. 9a–9c are perspective views of adjustable handles.
Figure 9B:
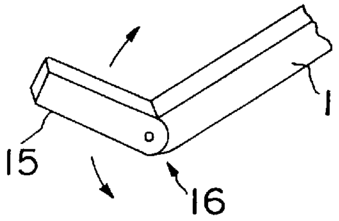
Figure 9C:
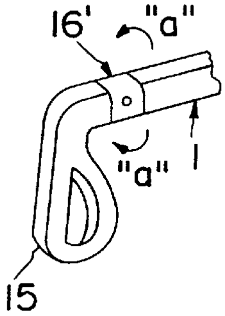

The antenna of FIG. 7 includes a handle 15 by which the antenna can be held horizontally and pointed along the direction of the boom 1. The position or angle of the handle 15 can be fixed with respect to the boom 1 as shown in FIG. 7. Alternatively, the handle 15 can be attached to the boom 1 by a pivotal connection 16 as depicted in FIG. 9*a*. The position or angle of the handle 15 in FIG. 9*a* can be adjusted and locked into position, by means of a conventional locking mechanism such as a spring biased pin or other detent arrangement. FIG. 9*b* depicts an alternative handle design which can be adjusted so as to form an extension of the boom 1. Positioning the handles 15 of FIGS. 9*a* and 9*b* 180° with respect to the axes of booms 1, will allow the booms 1 and folded antenna elements to easily slide into (and through)a storage case such as a bag, pouch or tube. FIG. 9*c* depicts an alternative handle arrangement in which handle 15 is attached to boom 1 by a rotatable connection 16' which allows handle 15 to rotate about the axis of boom 1 as indicated by arrows "a." The position of handle 15 in FIG. 9*c* can be adjusted and locked into position by means of a conventional locking mechanism such as a spring biased pin or other detent arrangement. According to further embodiments of the present invention, the handle 15 can be both pivoted as in FIGS. 9*a*–9*b* and rotated as in FIG. 9*c*, by combining the respective connection mechanisms.

The booms 1 depicted in FIGS. 1, 8, 9*a* and 9*b* have a square cross-section. Alternatively, the cross-section of these booms 1 can be of any convenient shape as discussed above.

Figure 10:
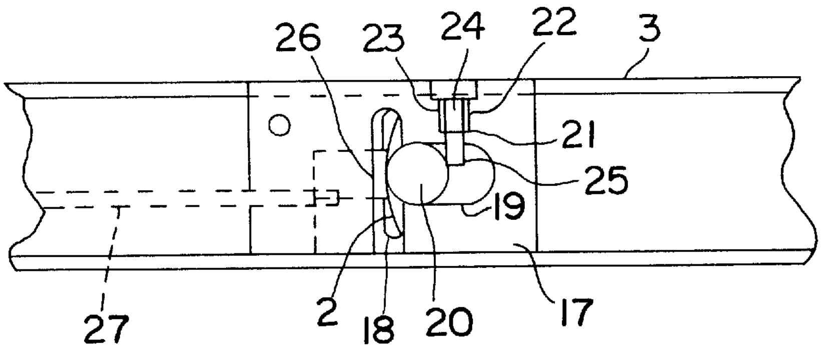
FIG. 10 is a partially cut away side view of an anchoring block for a driver element according to one embodiment of the present invention.

FIG. 10 is a partially cut away side view of an anchoring block for a driver element according to one embodiment of the present invention. As shown, and anchoring block 17 is positioned within boom 1. The anchoring block generally is sized and shaped to be received in boom 1. The anchoring block 17 can be secured in a desired position along the length of boom 1 by mechanical means such as screws or pins, push rivets, cements, epoxies, a press-tight fit, or equivalent means.

The anchoring block 17 includes an elongated slot 18 which receives a flexible antenna element 2. Elongated slot 18 is aligned with slots 13 provided in the sides of boom 1. Elongated slot 18 (and the corresponding slots formed in the side of boom 1) can be curved or straight. Anchoring block 17 includes a first bore 19 which extends along the length of the boom 1 and which is centrally positioned with respect to the side of the boom 1 as shown in FIG. 10. A ball bearing 20 is provided in the first bore 19. A second bore 21 intersects the first bore 19. The second bore 21 includes internal threads 22 and a stepped portion 23 near surface 3. As depicted, a threaded screw 24, preferably having a beveled, non-threaded end 25 is received in the second bore 21. Turning the threaded screw 24 so that it progresses into the second bore 21 causes the end 25 of the threaded screw 24 to urge ball bearing 20 against flexible antenna element 2. Tightening threaded screw 24 causes flexible antenna element 2 to be pressed firmly between ball bearing 20 and plate 26. According to one embodiment, the antenna elements are provided with small holes which are appropriately sized to allow the ball bearings to seat therein as they are pressed by the threaded screws. As can be appreciated, the manner by which the antenna elements are secured to the boom allows for easy assembly, and removal and replacement for repair during field use.

Figure 11:
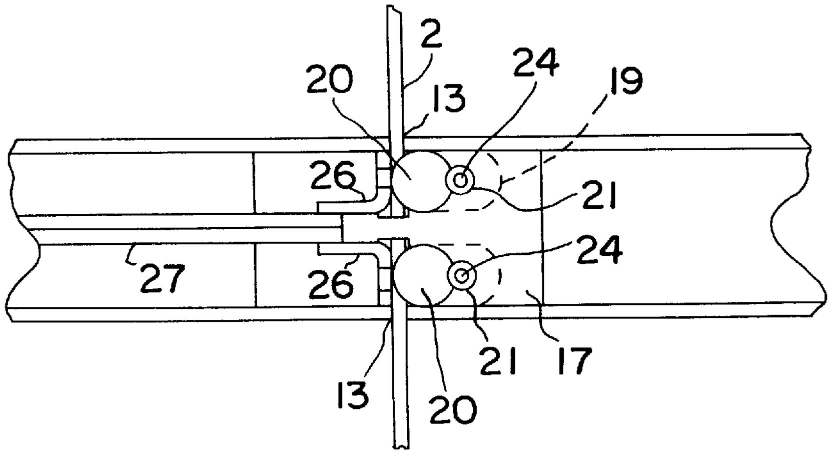
FIG. 11 is a partially cut away top view of the anchoring block of FIG. 10.

FIG. 11 is a partially cut away top view of the anchoring block of FIG. 10. As shown in FIG. 11, the ball bearings 20 are driven or pushed by screws 24 so as to press the flexible antenna elements 2 against plates 26. In this embodiment, the plates 26 are actually terminals of a balun 27 which is discussed in detail below. When plate 26 is not used (for the reflector and director elements), the flexible antenna element can be pressed between the ball bearing 20 the opposite wall of slot 18.

Figure 12:
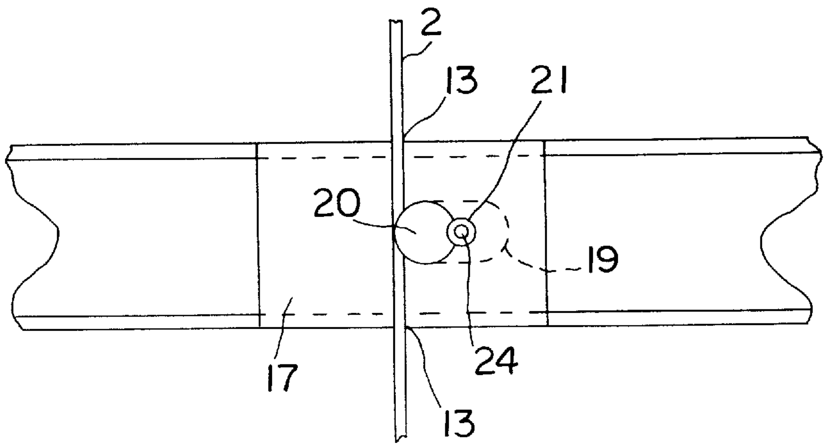
FIG. 12 is a partially cut away top view of an anchoring block for reflector or director elements according to one embodiment of the present invention.

The anchoring block 17 of FIGS. 10 and 11 is designed to secure a two-piece driver element. FIG. 12 is a partially cut away top view of an anchoring block for reflector or director elements according to one embodiment of the present invention. In order to secure the single antenna elements, i.e. the reflector and director elements, a single ball bearing clamping assembly as shown in FIG. 12 can be used if desired.

Figure 13:
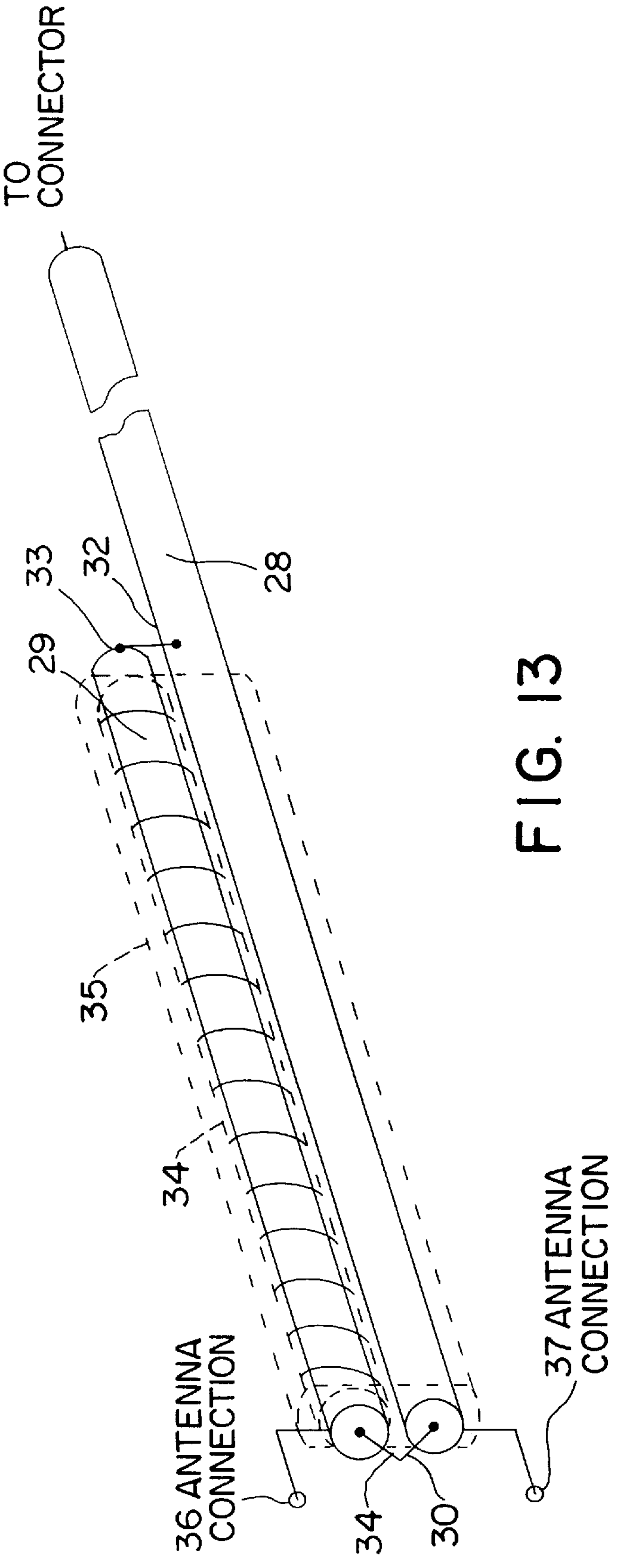
FIG. 13 is a circuit diagram for a balun used according to one embodiment of the present invention.

FIG. 13 is a circuit diagram for a balun used according to one embodiment of the present invention. The use of baluns in conjunction with adjustable-length dipole antennas is described by Roberts, "A New Wide-Band Balun," *Proceedings of the IRE,* December 1957, pp. 1628–1631, the disclosure of which is hereby incorporated by reference. The balun of FIG. 13 is particularly useful in the present invention, due to the fact that the antenna element, including the driver element, are subject to bending during use, resulting in an unbalanced load.

The balun 27 includes a first coaxial cable 28 which serves as a lead (to be attached to a receiver or transmitter) and a second coaxial cable 29 having a set length that can be either ⅛, ¼, or ⅜ wavelength long at the center frequency of the operating range of the antenna. A quarter wavelength will provide a broad bandwidth match, while the ⅛ and ⅜ wavelengths will provide a better match at narrower bandwidths. The balun length may therefore be selected to optimize size constraints and/or electrical constraints. A 50 ohm semi-rigid coaxial cable was found to be particularly suitable for purposes of the present invention. As depicted, the center conductor 31 of the second coaxial cable 29 is connected to the center conductor 30 of the first coaxial cable 28 at the antenna feed end. At the opposite end of the balun, the outer conductor 32 of the first coaxial cable 28 is connected to the outer conductor 33 of the second coaxial cable 29. The outer conductors of the first coaxial cable 28 and the second coaxial cable 29 are insulated from each other by an insulating sleeve 34 which is positioned about the second coaxial cable 29. In alternative embodiments, a strip of insulating material may be placed between the first and second coaxial cables. The coaxial cables are bound together by a second larger insulating sleeve 35 or by wrapping the coaxial cables with insulating tape. This arrangement makes the balun assembly easy to produce. The balanced antenna load is connected to the feed end of the balun at points 36 and 37.

The balun 27 is shown in FIGS. 10 and 11 as extending through the boom 1 and connecting to either arm of the driver element. The opposite end of the balun (not shown) can terminate at a standard coaxial connecter to which a lead to a receiver and/or transmitter can be attached. This coaxial connector can be mounted in any convenient manner to boom 1. The positioning of the balun within the boom or a channel in the boom protects the balun and the connection between the balun and the driver element.

In use for tracking radio transmitters which may be attached to an animal, the antenna is connected to a receiver input by a lead or cable attached to lead wire connector 9 or balun 27. The directional location of the radio transmitter is determined in a conventional manner by pointing the antenna in the suspected direction of the radio transmitter. The receiver is used to detect the strength of the signal and thus locate the radio transmitter. The antenna is hand-held and carried (together with the receiver) as the operator moves about the field of use. As the antenna is moved and the flexible antenna elements 2 encounter obstacles such as branches, vines, brush, etc. the flexible antenna elements 2 bend so as not to prevent movement of the antenna. Once the flexible antenna elements 2 pass by such obstructions, the flexible antenna elements 2 spring back to their original shape.

The antennas of the present invention can be used for reception and/or transmission in either the VHF, UHF or microwave frequency ranges, by selecting appropriate lengths for the flexible antenna elements and spacing the flexible antenna elements appropriately according to known parameters.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed:

1. An antenna comprising:

a rigid boom; and a plurality of flexible antenna elements attached to said boom, each of said plurality of flexible antenna elements having a fixed length and a curved cross-sectional shape, and being attached to said boom in such a manner so as to extend in linear alignment on opposite sides of said boom.

2. An antenna according to claim 1, wherein each of said plurality of flexible antenna elements lie within a common plane.

3. An antenna according to claim 1, wherein each of said plurality of flexible antenna elements are attached to a surface of said boom.

4. An antenna according to claim 1, wherein said boom includes a plurality of slots into which said flexible antenna elements are received and secured.

5. An antenna according to claim 4, wherein each of said plurality of slots have a width which is equal to or less than the width of each of said plurality of flexible antenna elements.

6. An antenna according to claim 5, wherein the width of each of said plurality of slots is less than the width of each of said plurality of flexible antenna elements.

7. An antenna according to claim 4, wherein said plurality of slots are formed exclusively in opposed sidewalls of said boom.

8. An antenna according to claim 1, wherein said plurality of flexible antenna elements includes a driver element, a reflector element and at least one director element.

9. An antenna according to claim 1, wherein said rigid boom includes a handle.

10. An antenna according to claim 9, wherein said handle is fixed relative to said rigid boom.

11. An antenna according to claim 9, wherein said handle is movable relative to said rigid boom.

12. An antenna according to claim 1, wherein the boom includes a channel which extends along a length thereof.

13. An antenna according to claim 1, further including a lead wire connector attached to the antenna.

14. An antenna according to claim 1, further comprising a balun attached to a pair of said plurality of flexible antenna elements which are linearly aligned.

15. An antenna according to claim 14, wherein the balun is attached within said boom to said pair of flexible antenna elements.

16. An antenna according to claim 15, wherein said balun is located within a channel provided in the rigid boom.

17. An antenna according to claim 1, wherein each of said plurality of flexible antenna elements extend through side walls of said rigid boom and are secured in position by anchoring blocks provided in said rigid boom.

18. An antenna according to claim 17, wherein each of said anchoring blocks includes a ball bearing which presses against and secures a flexible antenna element in position.

19. An antenna according to claim 18, wherein each of said anchoring blocks includes a threaded screw which pushes the ball bearing against the flexible antenna element.

20. An antenna according to claim 1, wherein a concave side of each of said plurality of flexible antenna elements faces an end of the rigid boom.

21. An antenna according to claim 1 in combination with a case into which said antenna can be stored after said plurality of flexible antenna elements are folded.

22. An antenna according to claim 21, wherein said case comprises a tubular-shaped case.

23. An antenna according to claim 1, wherein pairs of said plurality of flexible antenna elements are received in slots provided on said opposite sides of said boom so as to be in said linear alignment with one another.

24. An antenna according to claim 1, further including a mechanism which couples ends of the plurality of flexible antenna elements within the boom by means of an adjustable clamping element and which mechanism allows for field replacement of the flexible antenna elements.

25. A flexible antenna comprising;

a rigid boom;

a plurality of flexible antenna elements attached to said boom so as to extend in linear alignment on opposite sides of said boom, each of said plurality of flexible antenna elements having a fixed length and a curved cross-sectional shape.

26. A flexible antenna according to claim 25, wherein each of said plurality of flexible antenna elements extend through side walls of said rigid boom and are secured in position by anchoring blocks provided in said rigid boom.

27. A flexible antenna according to claim 26, wherein each of said anchoring blocks includes a ball bearing which presses against and secures a flexible antenna element in position.

28. A flexible antenna according to claim 27, wherein each of said anchoring blocks includes a threaded screw which pushes the bearing against the flexible antenna element.

29. A flexible antenna according to claim 25, wherein a concave side of each of said plurality of flexible antenna elements faces an end of the rigid boom.

30. A flexible antenna according to claim 25, wherein pairs of said plurality of flexible antenna elements are received in slots provided on said opposite sides of said boom so as to be in said linear alignment with one another.

31. A flexible antenna according to claim 25, further including a mechanism which couples ends of the plurality of flexible antenna elements within the boom by means of an adjustable clamping element and which mechanism allows for field replacement of the flexible antenna elements.

32. An antenna comprising:

a rigid boom; and a plurality of flexible antenna elements each having a free end which extends outside said boom and a fixed end which is located within and coupled to said boom, each of said plurality of flexible antenna elements having a fixed length and a curved cross-sectional shape, and being coupled to said boom in such a manner so as to maintain the curved cross-sectional shape thereof at the fixed end thereof.

33. An antenna according to claim 32, wherein said boom includes a plurality of slots into which said flexible element are received.

34. An antenna according to claim 33, wherein each of said plurality of slots has a curved shape.

35. An antenna according to claim 33, wherein said rigid boom includes a handle.

36. An antenna according to claim 35, wherein said handle is movable relative to said rigid boom.

37. An antenna according to claim 33, further comprising a balun which is located in said boom and attached to a pair of flexible antenna elements which are linearly aligned.

38. An antenna according to claim 33 wherein the fixed end of each of said plurality of flexible antenna elements is positioned in an anchoring block which includes a bearing that presses against and secures the fixed end thereof.

39. An antenna according to claim 38 wherein each of the anchoring blocks includes a threaded strew which pushes the bearing against the fixed end of a corresponding flexible antenna element.

40. An antenna according to claim 32, further including a mechanism which couples the fixed ends of the plurality of flexible antenna elements within the boom by means of an adjustable clamping element and which mechanism allows for field replacement of the flexible antenna elements.

41. A flexible antenna comprising;

a rigid boom;

a plurality of flexible antenna elements attached to said boom, each of said plurality of flexible antenna elements having a fixed length, a curved cross-sectional shape, a free end which extends outside said boom, and a fixed end which is located within said boom and attached thereto in such a manner so as to maintain the curved cross-sectional shape thereof at the fixed end thereof.

42. A flexible antenna according to claim 41, wherein said boom includes a plurality of slots into which said flexible element are received.

43. A flexible antenna according to claim 42, wherein each of said plurality of slots has a curved shape.

44. A flexible antenna according to claim 41, wherein said rigid boom includes a handle.

45. A flexible antenna according to claim 44, wherein said handle is movable relative to said rigid boom.

46. A flexible antenna according to claim 41, further comprising a balun which is located in said boom and attached to a pair of flexible antenna elements which are linearly aligned.

47. A flexible antenna according to claim 41 wherein the fixed end of each of said plurality of flexible antenna elements is positioned in an anchoring block which includes a bearing that presses against and secures the fixed end thereof.

48. A flexible antenna according to claim 47 wherein each of the anchoring blocks includes a threaded screw which pushes the bearing against the fixed end of a corresponding flexible antenna element.

49. A flexible antenna according to claim 41, further including a mechanism which couples the fixed ends of the plurality of flexible antenna elements within the boom by means of an adjustable clamping element and which mechanism allows for field replacement of the flexible antenna elements.

* * * * *